Sept. 15, 1931.  R. C. STROOP  1,823,069
AIRPLANE APPLIANCE
Original Filed Oct. 1, 1929
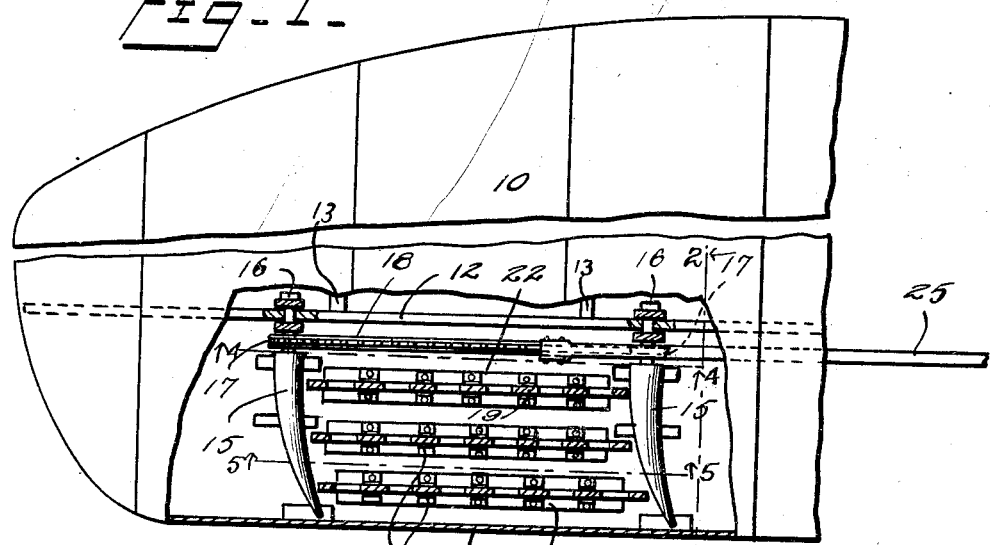
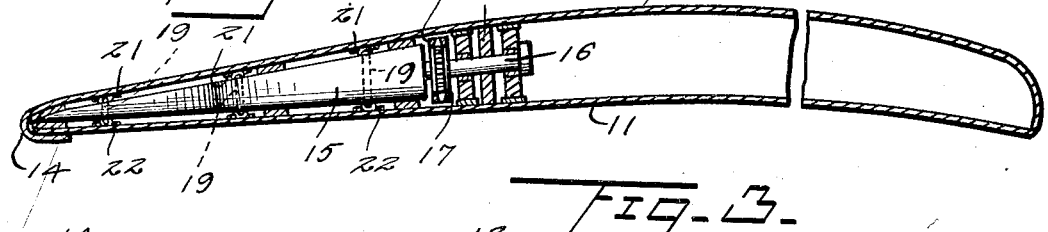
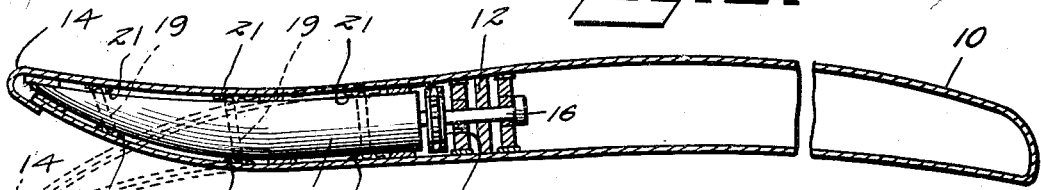
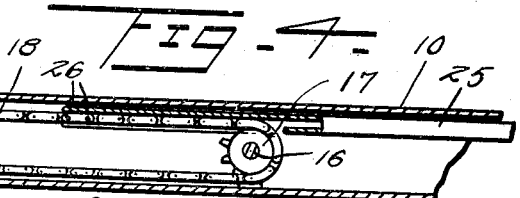
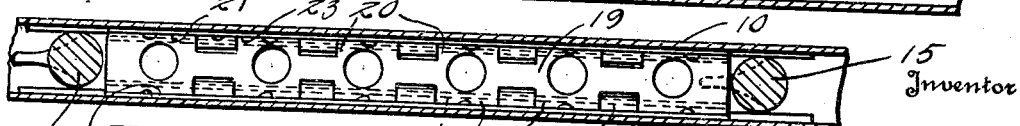
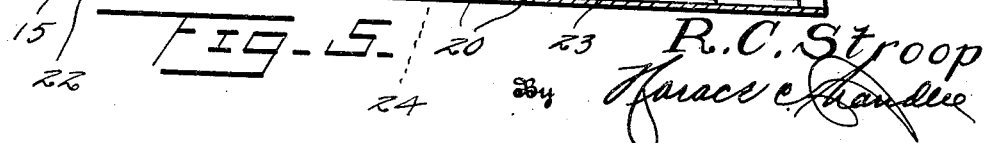
Inventor
R. C. Stroop
By Horace C. Chandlee
Attorney

UNITED STATES PATENT OFFICE

ROBERT C. STROOP, OF ROME, GEORGIA

AIRPLANE APPLIANCE

Application filed October 1, 1929, Serial No. 396,520. Renewed November 28, 1930.

This invention relates to new and useful improvements in airplanes, and particularly to means for manipulating the enter and trailing edges of the planes or wings, or like parts, of the airplanes.

The principal object of the invention is to provide a novel and improved means for producing a deflection of the entering or trailing edge of an airplane wing, rudder, or elevator.

Another object is to provide a novel and simple means whereby the entering or trailing edges of an airplane wing, elevator surface, or rudder surface, may be flexed upwardly or downwardly, whereby to produce a positive or negative lift.

Other objects and advantages will be apparent from the following description when taken in connection with the accompanying drawings.

In the drawings:

Figure 1 is a top plan view of a portion of an airplane wing, or plane surface, partly broken away to show the flexing means therein.

Figure 2 is a vertical transverse sectional view on the line 2—2 of Figure 1.

Figure 3 is a similar sectional view showing the edge of the wing flexed upwardly, in solid lines, and the said edge flexed downwardly, in dotted lines.

Figure 4 is a longitudinal section on the line 4—4 of Figure 1.

Figure 5 is a longitudinal sectional view on the line 5—5 of Figure 1.

Referring particularly to the accompanying drawings, there is shown a portion of an airplane wing which includes the upper surface 10, the lower surface 11, having the inner longitudinal bracing ribs 12, and the transverse bracing ribs 13. These surfaces 10 and 11 may be of any material such as plywood, metal, or the like, such surfaces being slidably engaged with each other at their peripheral edges as shown at 14.

Disposed within the rear edge of the wing are the horizontal and rearwardly extending members 15, which are rearwardly tapering and longitudinally curved. The forward or larger ends of the members 15 are provided with the reduced stems 16, which are journaled in the longitudinal bracing rib 12. Fixed on each of the stems 16, rearwardly of the rib 12, is a sprocket wheel 17, and engaged around said sprocket wheels is a chain 18, by means of which the members 15 may be simultaneously rotated. The normal positions of these members 15 are out of contact with the upper and lower portions of the wing, as shown in the sectional view, Figure 5, wherein the edge of the wing has its normal downward and rearward curve.

Extending longitudinally between the members 15, are the parallel vertical plates 19, each having a series of apertured ears 20 on its upper and lower edges. Secured to the lower face of the upper member of the wing is a longitudinally extending plate 21, while a similar plate 22 is secured to the upper face of the lower member of the wing. Each of these plates has a longitudinal series of apertured ears 23, which are disposed between the ears 20, of the plates 19, hinge pins 24 being disposed therethrough. Each of these plates 19 is formed with a plurality of openings, whereby to reduce the weight thereof.

A tubular rod 25 has one end cut away on its lower side to embrace a portion of the chain 18, certain of the pivot members 26, of the chain, being disposed through such tube end, whereby the chain may be moved upon movement of the tube, which results in the rotation of the members 15, and the upward or downward flexing of the edge of the wing. This rod 25 is suitably connected with the "stick", "wheel", or other control device of the airplane, not shown, in a manner well known, whereby the flexing of the wing edge is under the complete control of the aviator. This flexing of the wing edge regulates the lifting action of the wing, whereby such wing will cause the rapid or slow upward or downward movement of the airplane.

As the members 15 are rotated, in either direction, their opposite concave and convex faces contact with the upper and lower members of the wing, and cause such members to conform to the curvature thereof, whereby the edge portion of the wing will curve upwardly or downwardly, and thereby regulate the degree of lift of the plane.

What is claimed is:

1. The combination with an airplane wing, or the like including upper and lower faces, of means for flexing an edge thereof including arcuate members rotatable within said edge and in contact with said upper and lower faces, means for rotating the arcuate members whereby to curve said edge upwardly or downwardly, and means between and movably connected to said faces whereby to maintain contact between said faces and said arcuate members.

2. The combination with an airplane wing or the like including upper and lower faces, of means for flexing an edge thereof including rotatable arcuate members extending transversely of the wing at the edge thereof and in contact with said faces, and longitudinal parallel members extending between the arcuate members and hinged to said faces for maintaining relative position of the faces as the latter slide on each other during the rotation of said arcuate members.

3. The combination with an airplane wing, or the like including upper and lower faces, of means for flexing said edge and in contact with the said upper and lower faces thereof, means for rotating the arcuate members whereby to curve the said edge upwardly and downwardly, and longitudinally extending members movably connected with said upper and lower faces between said arcuate members for maintaining the said faces in proper relation to each other during their sliding movements and to maintain contact between said faces and said arcuate members.

In testimony whereof, I affix my signature.

ROBERT C. STROOP.